July 5, 1932.  P. J. McMANAMAN  1,865,777
AUTOMOBILE SIGNAL
Filed April 23, 1930   2 Sheets-Sheet 1

INVENTOR
PATRICK J. McMANAMAN
BY
John A. Bonnhardt
ATTORNEY

July 5, 1932.  P. J. McMANAMAN  1,865,777
AUTOMOBILE SIGNAL
Filed April 23, 1930  2 Sheets-Sheet 2
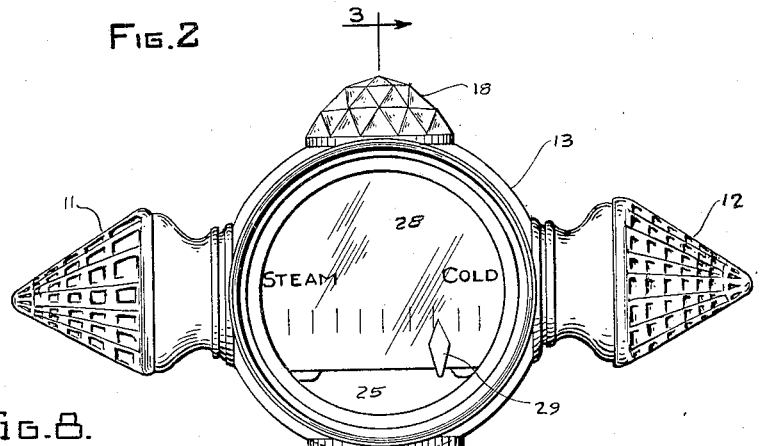
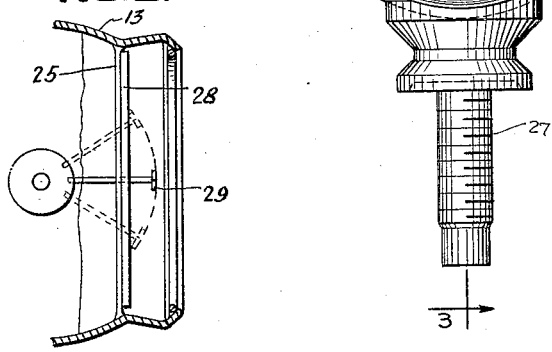
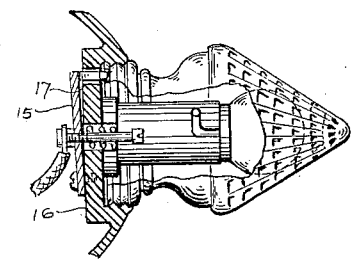
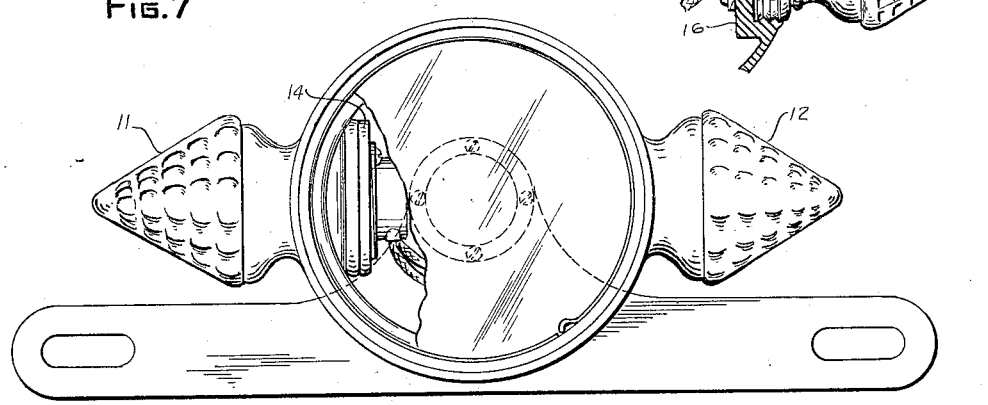
INVENTOR
PATRICK J. McMANAMAN
BY
ATTORNEY Patented July 5, 1932

1,865,777

UNITED STATES PATENT OFFICE

PATRICK J. McMANAMAN, OF CLEVELAND, OHIO

AUTOMOBILE SIGNAL

Application filed April 23, 1930. Serial No. 446,510.

This invention relates to automobile signals and has for its object to provide an improved combined radiator heat and direction signal providing a cap for the radiator. A further object is to provide improved means for fastening the lenses of such signals in position. A further object is to provide an ornamental and convenient device for said purpose, and to generally improve the details thereof.

The invention is illustrated in the accompanying drawings in which:—

Fig. 2 is a front elevation of the radiator heat signal.

Fig. 6 is a section taken on line 6—6 of Fig. 3.

Fig. 7 is a front elevation of the tail light and right and left turn signal, broken away to show the tubular shaped socket into which the arrow globes are turned.

Fig. 8 is a detail in section.

Figure 1:
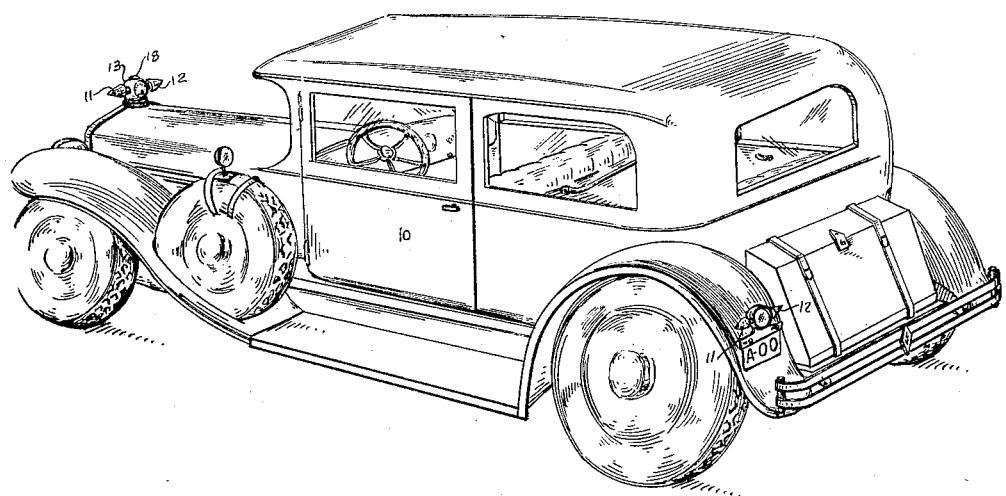
Fig. 1 is a perspective of a vehicle showing both the radiator heat signal and the tail light left and right turning signal in position.
Figure 3:
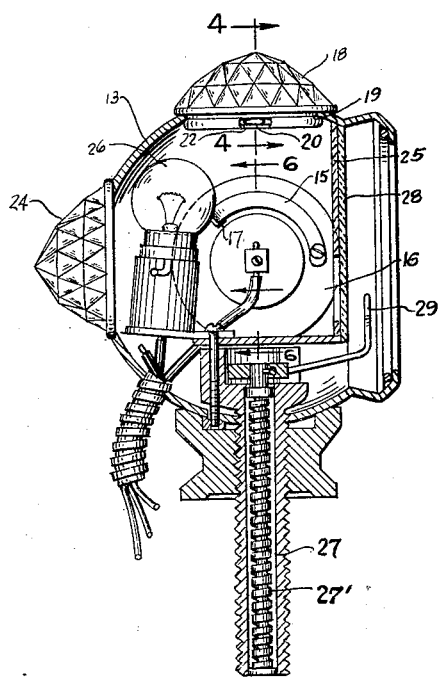
Fig. 3 is a section taken on line 3—3 of Fig. 2.
Figure 5:
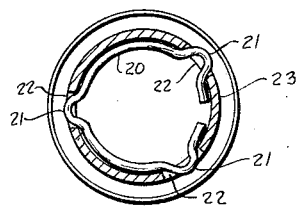
Fig. 5 is a section taken on line 5—5 of Fig. 4.
Figure 4:
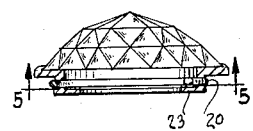
Fig. 4 is a section taken on line 4—4 of Fig. 3.

Referring to the drawings, 10 is the vehicle upon which the signals are mounted. The radiator heat signal consists of two red glass arrowhead lenses 11 and 12 turned into each side of the head or body 13 and locked in position in the tubular socket 14 as shown in Fig. 3, by means of a spring 15 attached to the back surface 16 of the tubular socket 14, the said spring 15 being attached by one end only, and the other end being free to work in and out in the slot 17, in the tubular socket 14. This spring catch 15 engages a notch in the red lenses 11 and 12 as the said lenses are turned into the sockets 14.

In removing the cap 18 from the top of the body 13, insert the blade of a screw driver or similar object, under the edge of the cap 18, tipping the blade which causes the spring points 21 to compress inward thus allowing the cap to slide out of the opening 19.

The top of body 13 has a cap 18 which fits in the opening 19, and is locked in position by the spring 20 which is pressed outward at several points as shown at 21 and these projections protrude through the slots 22 in the flange 23 of the cap, catching under the edge around the circular opening 19 and so holds the said cap 18 in position.

A green glass button 24 is mounted rigidly in the body and is illuminated, as are the cap 18 and the radiator heat indicator 25, by the bulb 26 mounted within the body 13 as shown in Fig. 3. The opening 19 in the top of the body 13 is for the purpose of changing the bulb 26 quickly.

The tail light and the radiator heat signals are both equipped in the same manner with the left and right turn lenses 11 and 12 so that the traffic in all directions may be warned of the impending turn. These signals may be operated by any suitable right and left turn devices known to the art.

The body 13 carries a depending thermostat comprising a tube 27 enclosing a coil thermostatic element 27' of known construction which tends to coil or uncoil under different degrees of heat, the upper end being free to turn in consequence of such action and carrying an indicator point 29 which moves in consequence in front of the indicating lens 28, as shown in Fig. 8.

The invention provides an improved radiator cap structure, and improved means for holding the lenses of any light in position. Also, easy access is provided to the bulb in the radiator cap.

I claim:

A head for radiators comprising a hollow body having a bulb therein, a removable lens cap in the top of the body, a thermostat tube projecting downwardly from said body and having a pivot bearing head within the same on which head the body is mounted, the rear side of the body having an indicator lens therein, and a swinging pointer attached to said pivot and projecting on the outer side of said indicator lens.

In testimony whereof, I do affix my signature.

PATRICK J. McMANAMAN.